(12) United States Patent
Malcolm

(10) Patent No.: US 8,132,156 B2
(45) Date of Patent: Mar. 6, 2012

(54) METHODS AND SYSTEMS FOR TESTING TOOL WITH COMPARATIVE TESTING

(75) Inventor: David H. Malcolm, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 1296 days.

(21) Appl. No.: 11/763,416

(22) Filed: Jun. 14, 2007

(65) Prior Publication Data

US 2008/0313616 A1 Dec. 18, 2008

(51) Int. Cl.
*G06F 9/44* (2006.01)
(52) U.S. Cl. ........ 717/124; 717/122; 717/126; 717/130; 717/157
(58) Field of Classification Search .................. 717/143, 717/144, 122, 126, 130, 157; 714/27
See application file for complete search history.

(56) References Cited

U.S. PATENT DOCUMENTS

| | | | | |
|---|---|---|---|---|
| 5,259,766 A * | 11/1993 | Sack et al. | ..................... | 434/362 |
| 5,583,988 A * | 12/1996 | Crank et al. | ..................... | 714/48 |
| 5,590,329 A * | 12/1996 | Goodnow et al. | ............. | 717/144 |
| 5,758,163 A * | 5/1998 | Safonov | ......................... | 717/144 |
| 5,790,778 A * | 8/1998 | Bush et al. | ..................... | 714/38.1 |
| 5,860,011 A * | 1/1999 | Kolawa et al. | ................. | 717/142 |
| 6,038,270 A * | 3/2000 | Watanabe et al. | ............. | 375/343 |
| 6,236,993 B1 * | 5/2001 | Fanberg | ........................ | 707/690 |
| 6,256,773 B1 * | 7/2001 | Bowman-Amuah | .......... | 717/121 |
| 6,367,068 B1 * | 4/2002 | Vaidyanathan et al. | ...... | 717/143 |
| 6,895,578 B1 * | 5/2005 | Kolawa et al. | ................ | 717/130 |
| 7,210,138 B2 * | 4/2007 | Zatloukal et al. | ............. | 717/143 |
| 7,240,340 B2 * | 7/2007 | Vaidyanathan et al. | ...... | 717/143 |
| 2003/0005408 A1 * | 1/2003 | Tumati | .......................... | 717/110 |
| 2006/0009962 A1 * | 1/2006 | Monk | ............................... | 704/4 |
| 2006/0293935 A1 * | 12/2006 | Tsyganskiy et al. | .............. | 705/7 |
| 2007/0011655 A1 * | 1/2007 | Tumati | .......................... | 717/122 |
| 2008/0126867 A1 * | 5/2008 | Pandarinathan et al. | ....... | 714/37 |

OTHER PUBLICATIONS

Darus "Java Source Code Analysis Tool", Dec. 2002.*
Xu et al. "Automatic Diagnosis of Student Programs in Programming Learning Environments", 1999, pp. 1102-1107.*
Horwitz "Identifying the Semantic and Textual Differences Between Two Versions of a Program", 1990, pp. 234-245.*
Yang "Identifying Syntactic Differences Between Two Programs", 1991, pp. 739-755.*
Kim et al., "Automatic Inference of Structural Changes for Matching Across Program Versions", 2007.*
Kim et al., "Program Element Matching for Multi-version Program Analyses", 2006, ACM.*

* cited by examiner

*Primary Examiner* — Phillip Nguyen
(74) *Attorney, Agent, or Firm* — Lowenstein Sandler PC

(57) ABSTRACT

Embodiments of the present invention provide a multi-input comparative testing tool. The present invention looks at the internal structure of the software being tested and compares the two pairs of internal structures. In the present invention, the testing tool is capable of receiving multiple program code files or data files as its input. For each program code file, the testing tool generates a collection of problem objects and compares pairs of the problem collections with each other. The present invention may also run on data files having program code. For example, the present invention is capable of testing extensible markup language (XML) files to determine if they validate against a schema. Problem objects that are in both collections are identified and set aside. The remaining problem objects are then marked either as being resolved or new depending in which collection they exist.

14 Claims, 3 Drawing Sheets

METHODS AND SYSTEMS FOR TESTING TOOL WITH COMPARATIVE TESTING

FIELD OF THE INVENTION

The present invention relates to testing of software.

BACKGROUND OF THE INVENTION

Analyzing and debugging program code is a well known difficult task. There are various tools that attempt to assist in analyzing program code. These tools typically read in one or more input files and report various problems encountered.

During development, program code is repeatedly tested by these tools. When a developer writes new software or changes existing software, that software is typically subjected to a battery of tests. For software projects involving a large program (such as an operating system), a large number of regression tests are usually performed to ensure, for example, that the change do not render the larger program inoperable or cause the program to behave unexpectedly.

Unfortunately, this results in a large amount of problem reports that a developer must analyze. Many of these problem reports are limited in their effectiveness. This is because most problem reports contain problems that are false positives or problems that are otherwise considered acceptable. In addition, many problem reports contain large number of problems identified. Typically, a developer must manually sift through these problem reports and decide which ones merit fixing.

Eventually, a developer becomes saturated from running the same tests repeatedly and reviewing the same test results many times. This eventually leads to errors being overlooked, which defeats the purpose of the testing.

Accordingly, it would be desirable to provide a testing tool that can automate the testing process and provide effective reports, especially when the testing tool is repeatedly utilized.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide a multi-input comparative testing tool. The present invention looks at the internal structure of the software being tested and compares the two pairs of internal structures. In the present invention, the testing tool is capable of receiving multiple program code files or data files as its input. For each program code file, the testing tool generates a collection of problem objects and compares pairs of the problem collections with each other. The present invention may also run on data files having program code. For example, the present invention is capable of testing extensible markup language (XML) files to determine if they validate against a schema. Problem objects that are in both collections are identified and set aside. The remaining problem objects are then marked either as being resolved or new depending in which collection they exist.

Reference will now be made in detail to the exemplary embodiments of the invention, which are illustrated in the accompanying drawings. Wherever possible, the same reference numbers will be used throughout the drawings to refer to the same or like parts.

Figure 1:
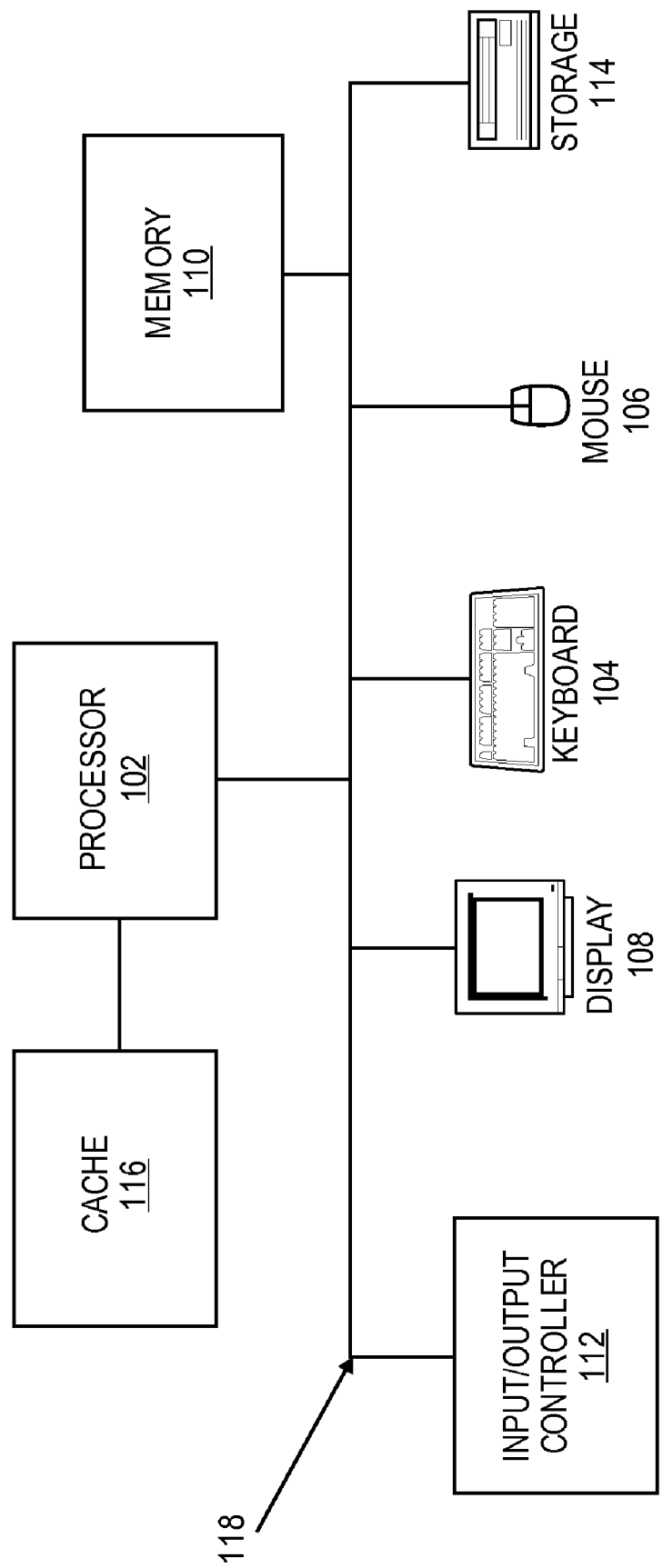
FIG. 1 illustrates an exemplary system.

FIG. 1 illustrates a general purpose computer system 100 that is consistent with the principles of the present invention. Computer system 100 may be programmed to provide a program code auditing tool that is consistent with the principles of the present invention. Examples of the components that may be included in computer system 100 will now be described.

As shown, a computer system 100 may include a central processor 102, a keyboard 104, a pointing device 106 (e.g., mouse, or the like), a display 108, a main memory 110, an input/output controller 112, and a storage device 114. Processor 102 may further include a cache memory 116 for storing frequently accessed information. Cache 116 may be an "on-chip" cache or external cache. System 100 may also be provided with additional input/output devices, such as a printer (not shown). The various components of the system 100 communicate through a system bus 118 or similar architecture.

Figure 2:
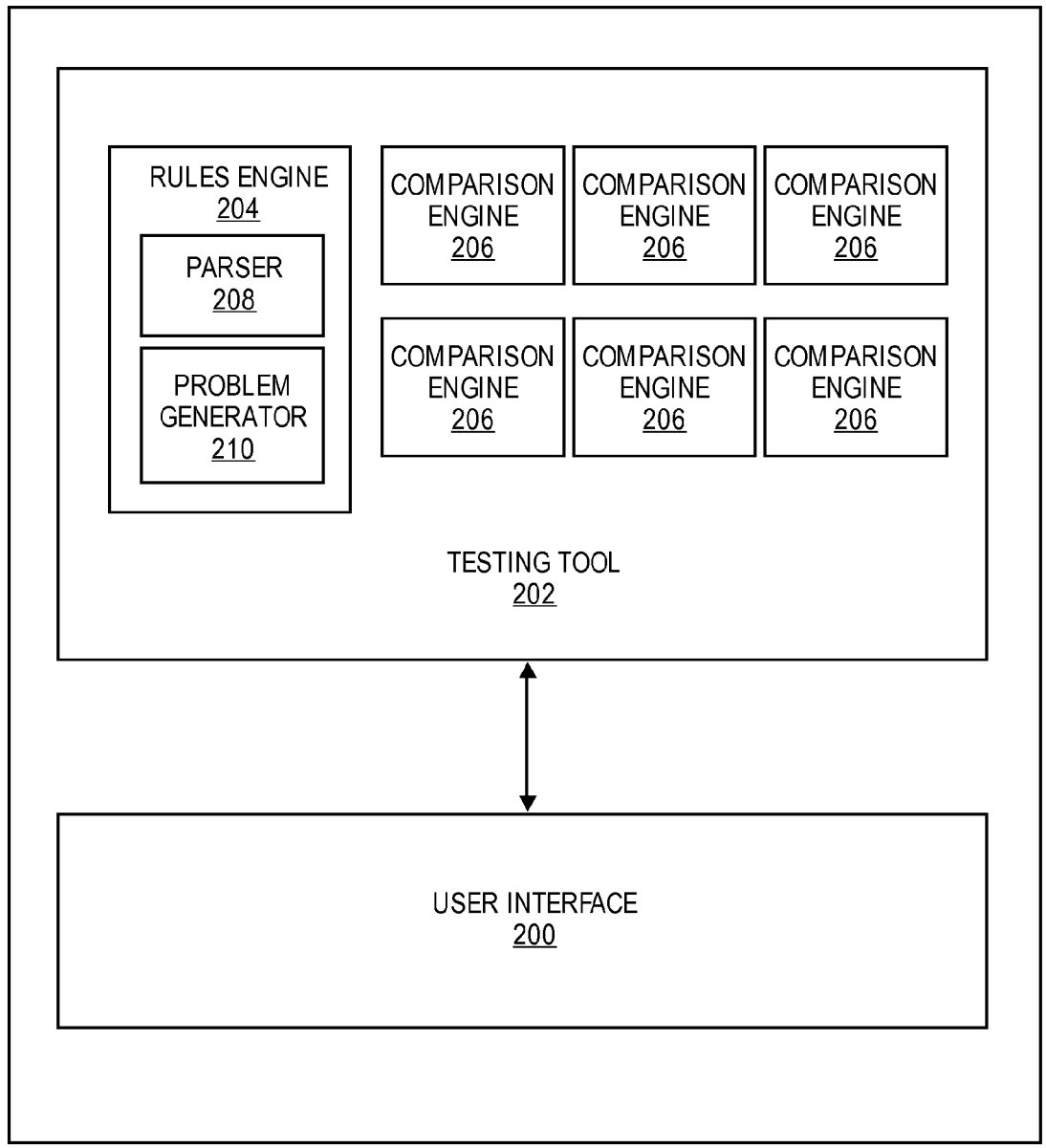
FIG. 2 illustrates an exemplary architecture of a testing tool.

FIG. 2 illustrates a functional block diagram of system 100 in which one embodiment of the present invention may be implemented. As shown, system 100 comprises a user interface (UI) 200, and a testing tool 202.

UI 200 provides an interface for a user to interact with the other components, such as testing tool 202. In one embodiment, UI 200 may be implemented as a graphical user interface, which is well known to those skilled in the art. Of course UI 200 may take the form of any type of user interface, such as a text-based interface.

UI 200 may allow the user to perform a number of different functions and operations. For example, UI 200 may view the program code being audited or may provide an editor for writing/modifying program code. UI 200 may use a number of different windows to display the program code. Of course, UI 200 may allow the user click on or select various portions of program code to perform various actions, such as editing statements, specifying breakpoints, etc. Such features are well known to those skilled in the art.

The user may further use UI 200 to initiate processing by testing tool 202. For example, the user may specify a file or location for the program code to be processed by testing tool 202. The user may also use UI 200 to specify various options offered by testing tool 202.

UI 200 may show the results of an audit by visually using color or typographic symbols to mark the relevant portions of the code. UI 200 may also allow the user to mark some piece of code as "OK." This indication may also be used to adjust the history of the code so that system 100 can learn from its own operations and from the user. Alternatively, UI 200 may allow a user to mark a piece of code as having a known flaw or bug, a known fix, or a known false positive. For example, the user may use a special marker to indicate that a piece of program code contains "a security fix of type FOO."

Testing tool 202 is responsible for testing program code of a wide variety of programming languages, such as C, C++, and the like. Testing tool 202 may also assist the user when writing new code while the user is typing in the program code or based on a batch processing. For example, the user may submit a section of new code to testing tool 202 via UI 202, which then invokes testing tool 202 to analyze problem objects for the new code. Testing tool 202 may then analyze the new code and identify or highlight those lines which have a high probability of containing a security flaw, error, or bug.

Testing tool 202 may also determine whether a known fix exists, based on the histories for the security flaw or bug. This information may then be presented via UI 202 in various forms, such as one or more pop-up windows or by highlighting or marking the relevant sections of the program code.

Having discussed some of the general features of testing tool 202, the components of testing tool 202 will now be further described. As shown, testing tool 202 comprises a rules engine 204 and a set of comparison engines 206.

Rules engine 204 analyzes the software being tested and models the characteristics of the software including its potential errors or problems. Accordingly, rules engine 204 may further comprise a parser 208 and a problem object generator 210. These components will now be further described.

Parser 208 analyses the input source code or data files for the software being tested. In general, parser 208 may comprise a lexer that transforms the input into a sequence of lexical tokens and a grammar parser that reads the lexical sequence and transforms it into a tree structure. For example, parser 208 may analyze input source code of software into a sequence of tokens to determine its grammatical structure and transforms into a data structure, which is suitable for later processing. Parsers for various programming languages, such as C, C++, etc., are well known to those skilled in the art. Parser 208 may parse the source code one symbol at a time, or may parse the source code into words or groups of symbols based on the rules of the programming language.

Problem object generator 210 analyzes the data structure outputted from parser 208 for model errors in the source code as problem objects. Problem object generator 210 may use a set of heuristics to classify and model such errors. For example, many errors in source code can be classified into well known classes, such as untrusted format data, divide by zero, element missing, unexpected element, etc. In general, problem object generator 210 forms problem objects based on a set of heuristics that a symbol "X" within a context "Y" (such as the programming language of the program code) occurred based on a history "Z." Problem object generator 210 may determine the context, for example, based on the specific language used in the program code and the various statements in which a symbol appears. Accordingly, for each problem found in the source code, problem object generator 210 will create a problem object. Each problem object thus contains a class of the problem and a pointer attribute that indicates the location of the problem found in the source code.

Comparison engines 206 take the data structure from parser 208 and the problem objects from generator 210 and evaluate the significance of each error. As shown, testing tool 202 may comprise a plurality of comparison engines 206. The number of comparison engines 206 may vary depending on a number of factors, such as the desired speed of testing tool, number of input source code files, size of the source code files, etc. For example, the following fragment of Python code may be used by comparison engines 206 for XML validation.

```
class MissingAttribute(Problem):
    """
    Problem object representing a node missing an attribute
    expected of it within the schema
    """
    def __init__(self, node, attrName):
        self.node = node
        self.attrName = attrName
    def __str__(self):
        """
        Method to turn the problem object into a string.
```

```
        """
        return 'Missing attribute "%s" for element at %s'%(self.attrName,
    get_xpath(self.node))
    def __eq__(self, other):
        """
        Overloaded comparison operator that is used to compare instances
    of problem, using domain-specific knowledge.
        """
        if type(other)!=MissingAttribute:
            return False
        if self.attrName != other.attrName:
            return False
        # use XPaths of the nodes, to get a domain-specific comparison
        if get_xpath(self.node) == get_xpath(other.node)
            return True
        else:
            return False
```

Comparison engines 206 may utilize multiple versions of a particular file of source code. The versions used by comparison engines 206 may be predetermined or specified by the user, for example, via UI 200. Comparison engines 206 may retrieve versions locally from storage 114 or remotely from another device (not shown). For example, system 100 may be coupled to a library or database that contains a large number of versions for program code. This library may be organized in various ways, such as by programming language, by type of flaw, by date, by application, by operating system, etc.

In some embodiments, comparison engines 206 may retrieve problem objects for a set of program code by using a known version, such as a history for a set of program code with a known flaw or a history for a set of program code that is known to operate properly, and compare it to the subject of the test. In other embodiments, comparison engines 206 may use multiple versions of source code files. For example, a first (or insecure) version may be a set of collected code that is known to have security hole or bug from past experience.

Figure 3:
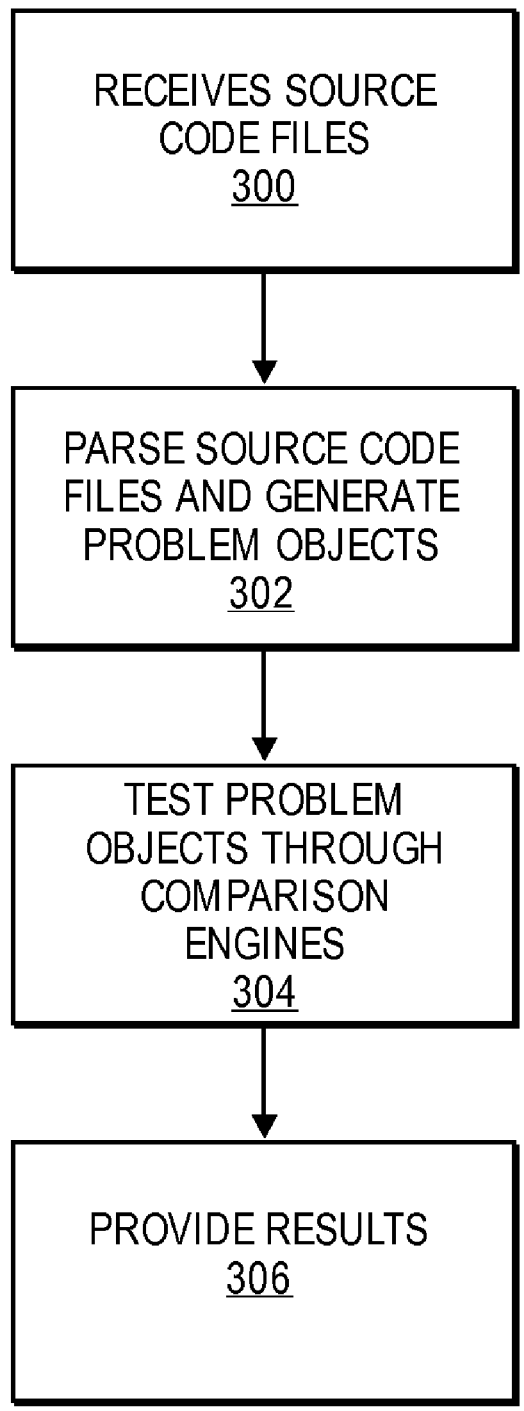
FIG. 3 illustrates an exemplary process for performing comparative testing on software in accordance with the present invention.

FIG. 3 illustrates an exemplary process for performing comparative testing on software in accordance with the present invention. In phase 300, testing tool 202 is provided a set of software files to analyze. For example, a user may manually input or upload these files into testing tool 202 via UI 200. Alternatively, the user may provide a link to the location of the desired files.

In phase 302, rules engine 204 analyzes the source code files. As noted, parser 208 in rules engine 204 parses the source code files and outputs data structures, such as trees, which represent the source code files. Of note, this parsing step allows testing tool 202 to analyze the source code at a higher level of abstraction. This is because, as changes are made to source code, most testing tools may view an old error as a new error simply because of a minor change in location. In contrast, the present invention may avoid this problem by parsing the source code into a tree data structure and modeling the problems using problem objects. In particular, the present invention is looking at the internal structure of the software being tested and compares the two pairs of internal structures.

Problem object generator 210 analyzes the source code and generates problem objects that correspond to potential errors found in the source code. Each problem object provides a class and a pointer to the tree. A problem object may also contain other information, such as information indicating the symptoms of the problem. Processing then flows to phase 304.

In phase 304, comparison engines 206 analyze the parse tree and problem objects of the inputted source code files and evaluate the significance of each error. For example, problem objects found in multiple source code files may be viewed as false positive errors or errors that are considered tolerable. In contrast, problem objects found in only one or relatively few source code files may be marked as new or significant. Other algorithms for evaluating problem objects are well known to those skilled in the art.

In phase 306, testing tool 202 takes the results from comparison engines 206 and prepares a report for the user. For example, testing tool 202 may provide the report via UI 200. Of course, one skilled in the art will recognize that this report may be formatted and displayed in various ways to assist in its interpretation.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of performing comparative testing on contents of a program code file, said method comprising:
    parsing, by a computing device executing a testing tool, the contents of a new version of the program code file into a tree data structure;
    generating, by the computing device, problem objects for errors in the contents of the new version of the program code file, wherein each problem object comprises a class and a pointer to a location in the tree data structure, wherein the class is used to classify an error in the new version of the program code file;
    comparing the problem objects of the contents of the new version of the program code file to problem objects of a previous version of the program code file; and
    marking at least one of the problem objects of the contents of the new version of the program code file or the problem objects of the previous version of the program code file with a level of significance based on the comparison, the level of significance reflecting a tolerability of the problem objects in the program code file, wherein problem objects that are present in only the new version of the program code file are marked as new problems and problem objects that are present in only the previous version of the program code file are marked as resolved problems.

2. The method of claim 1, wherein marking the problem objects comprises marking the problem objects that are present in multiple versions of the contents of the program code file as a low level of significance.

3. The method of claim 1, wherein marking the problem objects comprises marking the problem objects that are present in all versions of the contents of the program code file as a false positive error.

4. The method of claim 1, wherein marking the problem objects comprises marking the problem objects that are present in only a new version of contents of the program code file as a high level of significance.

5. The method of claim 1, wherein marking the problem objects comprises marking the problem objects that are present in only an old version of contents of the program code file as a medium level of significance.

6. A method of identifying errors in program code based on comparative testing, wherein the comparative testing is performed on at least a first program code file having a first collection of problem objects and a second program code file having a second collection of problem objects, said method comprising:
    receiving, by a computing device executing a testing tool, the first program code file and the second program code file;
    determining, by the computing device, a first structure of the first program code file and a second structure of the second program code file;
    determining, by the computing device, the first collection of problem objects based on the first structure and the second collection of problem objects based on the second structure, wherein at least one problem object in the first collection of problem objects comprises a class and a pointer to a location in the first structure and at least one problem object in the second collection of problem objects comprises a class and a pointer to a location in the second structure, wherein the class is used to classify an error in at least one of the first program code file or the second program code file;
    deleting problem objects that are present in both the first and second collections; marking remaining problem objects in the first collection as being resolved in the second program code file; and
    marking remaining problem objects in the second collection as being new in the second program code file.

7. The method of claim 6, wherein receiving the first program code file comprises receiving a program code file having a known set of errors.

8. A non-transitory computer readable medium including instructions for a comparative testing tool that, when executed by a processing device cause the processing device to perform a method, comprising:
    receiving multiple program code files;
    identifying, by the processing device using a problem collection generator executed by the processing device, collections of problem objects present in each of the multiple program code files based on an object oriented model that classifies errors in the multiple program code files based on a class and behavior, wherein the problem collection generator is configured to determine pointers for the problem objects that indicate a location of the errors in the multiple program code files, wherein each problem object in the collections of problem objects comprises a class and a pointer to a location of an error in one of the multiple program code files, the class classifying the error in one of the multiple program code files;
    comparing, by the processing device using a set of comparison engines executed by the processing device, respective internal structures of the multiple program code files, pairs of the problem objects from the collections; and
    determining which of the problem objects have been resolved and which of the problem objects are new.

9. The non-transitory computer readable medium of claim 8, the method further comprising parsing the multiple program code files into data structures that model contents of the multiple program code files.

10. The non-transitory computer readable medium of claim 8, wherein the set of comparison engines are configured to compare a specific class of the problem objects.

11. A non-transitory computer readable storage medium including instructions that, when executed by a processing device, cause the processing device to perform a method comprising:
    receiving, by the processing device, a first program code file and a second program code file;

determining, by the processing device, first structures of the first program code file and second structures of the second program code file;

determining, by the processing device, a first collection of problem objects of the first program code file based on the first structures and a second collection of problem objects of the second program code file based on the second structures, wherein at least one problem object in the first collection of problem objects comprises a class and a pointer to a location in the first structures and at least one problem object in the second collection of problem objects comprises a class and a pointer to a location in the second structures, wherein the class is used to classify an error in at least one of the first program code file or the second program code file;

deleting problem objects that are present in both the first collection of problem objects and the second collection of problem objects;

marking remaining problem objects in the first collection as being resolved in the second program code file; and marking remaining problem objects in the second collection as being new in the second program code file.

12. The non-transitory computer readable storage medium of claim 11, wherein receiving the first program code file comprises receiving a program code file having a known set of errors.

13. A computing apparatus comprising:

a memory to store instructions for a testing tool; and a processing device coupled to the memory, wherein the processing device is configured to:

parse contents of a new version of a program code file into a tree data structure;

generate problem objects for errors in the contents of the new version of the program code file, wherein each problem object comprises a class and a pointer to a location in the tree data structure, wherein the class is used to classify an error in the new version of the program code file;

compare the problem objects of the contents of the new version of the program code file to problem objects of a previous version of the program code file; and mark at least one of the problem objects of the contents of the new version of the program code file or the problem objects of the previous version of the program code file with a level of significance based on the comparison, the level of significance reflecting a tolerability of the problem objects in the program code file, wherein problem objects that are present in only the new version of the program code file are marked as new problems and problem objects that are presented in only the previous versions of the program code file are marked as resolved problems.

14. The computing apparatus of claim 13, wherein marking the problem objects comprises marking the problem objects that are present in multiple versions of the contents of the program code file as a low level of significance, marking the problem objects that are present in only a new version of contents of the program code file as a high level of significance and marking the problem objects that are present in only an old version of contents of the program code file as a medium level of significance.

* * * * *